(12) United States Patent
Nishioka et al.

(10) Patent No.: US 10,113,061 B2
(45) Date of Patent: Oct. 30, 2018

(54) POLYESTER RESIN COMPOSITION AND MOLDING

(71) Applicants: SUMITOMO SEIKA CHEMICALS CO., LTD., Hyogo (JP); ADVANCED SOFTMATERIALS INC., Kashiwa-shi, Chiba (JP)

(72) Inventors: Kiyoshi Nishioka, Hyogo (JP); Tokushi Koda, Hyogo (JP); Naoyuki Hashimoto, Chiba (JP)

(73) Assignees: Sumitomo Seika Chemicals Co., Ltd., Hyogo (JP); Advanced Softmaterials Inc., Chiba (JP)

( * ) Notice: Subject to any disclaimer, the term of this patent is extended or adjusted under 35 U.S.C. 154(b) by 0 days.

(21) Appl. No.: 15/325,331

(22) PCT Filed: Aug. 20, 2015

(86) PCT No.: PCT/JP2015/073340
§ 371 (c)(1),
(2) Date: Jan. 10, 2017

(87) PCT Pub. No.: WO2016/031664
PCT Pub. Date: Mar. 3, 2016

(65) Prior Publication Data
US 2017/0198138 A1    Jul. 13, 2017

(30) Foreign Application Priority Data
Aug. 25, 2014 (JP) ................... 2014-170629

(51) Int. Cl.
    C08L 67/04      (2006.01)
    C08L 71/02      (2006.01)
    C08L 101/16     (2006.01)
    C08G 83/00      (2006.01)
    C08G 65/331     (2006.01)

(52) U.S. Cl.
    CPC .............. C08L 67/04 (2013.01); C08L 71/02 (2013.01); *C08G 65/3314* (2013.01); *C08G 83/007* (2013.01); *C08L 101/16* (2013.01); *C08L 2201/06* (2013.01)

(58) Field of Classification Search
    CPC ........................ C08L 67/04; C08L 2201/06
    USPC ............................................................ 524/48
    See application file for complete search history.

(56) References Cited

U.S. PATENT DOCUMENTS

| | | | |
|---|---|---|---|
| 2008/0097039 A1* | 4/2008 | Ito ............................. | B01J 20/26 525/384 |
| 2009/0042034 A1* | 2/2009 | Ito ....................... | C08B 37/0015 428/413 |
| 2009/0281213 A1 | 11/2009 | Ito et al. | |
| 2012/0316278 A1* | 12/2012 | Inoue ................... | C08G 83/007 524/413 |
| 2014/0080936 A1* | 3/2014 | Kim .................... | C08B 37/0012 522/8 |
| 2016/0222285 A1 | 8/2016 | Shimizu et al. | |

FOREIGN PATENT DOCUMENTS

| | | |
|---|---|---|
| EP | 3 070 142 | 9/2016 |
| JP | 2001-026658 | 1/2001 |
| JP | 2001-064379 | 3/2001 |
| JP | 2003-292474 | 10/2003 |
| JP | 2008-045055 | 2/2008 |
| JP | 2008-291267 | 12/2008 |
| JP | 2011-241401 | 12/2011 |
| JP | 2014-084414 | 5/2014 |
| JP | 2014084414 A * | 5/2014 |
| WO | 2008/020618 | 2/2008 |

* cited by examiner

*Primary Examiner* — Hui H Chin
(74) *Attorney, Agent, or Firm* — Hamre, Schumann, Mueller & Larson, P.C.

(57) ABSTRACT

The present invention aims to provide a polyester resin composition capable of producing a molded article having excellent stretchability. The present invention also aims to provide a molded article including the polyester resin composition. The present invention relates to a polyester resin composition including: a polyester resin; and a polyrotaxane that has a cyclic molecule, a linear molecule threading through a cavity of the cyclic molecule in a skewered manner, and capping groups capping both ends of the linear molecule.

3 Claims, 1 Drawing Sheet

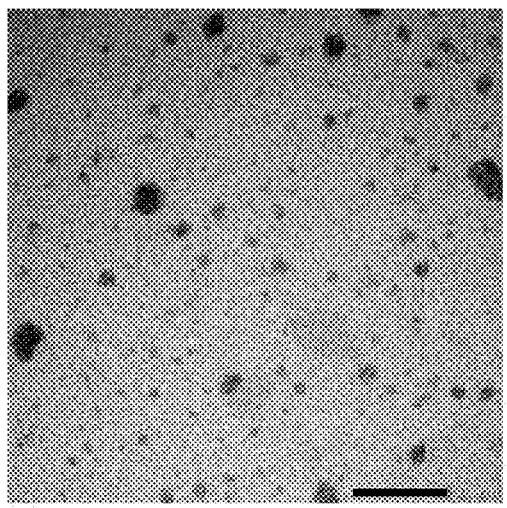

POLYESTER RESIN COMPOSITION AND MOLDING

TECHNICAL FIELD

The present invention relates to a polyester resin composition. The present invention also relates to a molded article including the polyester resin composition.

BACKGROUND ART

A global demand for reduction of plastic waste has been increasing in recent years. The use of degradable plastics, especially biodegradable plastics is widely studied as a means to meet the above demand. Known examples of typical biodegradable plastics include polyester resins such as petroleum-derived polyglycolic acid, polylactic acid prepared using starch as a raw material, aliphatic polyesters prepared using biomass-derived diols and dicarboxylic acids as raw materials, and aliphatic polyesters produced by microorganisms, and aliphatic polycarbonates. These resins are microbially metabolized during composting thereof to be decomposed finally into carbon dioxide and water. In particular, biodegradable polyester resins are now relatively inexpensive owing to expansion of production and improvement of the production technology, and therefore are considered to be used in the place of a general-purpose resin that is hardly biodegradable and expected to be used for various applications. Such polyester resins however are problematically hard but brittle to have poor impact resistance, so as to be hardly used alone in the place of a general-purpose resin.

The flexibility, stretchability, and impact resistance are imparted to a hard polyester resin, for example, by adding a low-molecular-weight plasticizer as disclosed in Patent Literature 1, or by blending a soft aliphatic polyester such as polycaprolactone or polybutylene succinate with the hard polyester resin as disclosed in Patent Literatures 2 and 3. However, the low-molecular-weight plasticizer disclosed in Patent Literature 1 needs to be added in a large amount for exertion of a sufficient effect. In such a case, the plasticizer may bleed out to the surface with time to impair the appearance or lower the physical properties. The soft aliphatic polyesters disclosed in Patent Literatures 2 and 3 also need to be added in a large amount for achieving sufficient flexibility, resulting in reduction in other physical properties of the polyester resin (e.g., a significant decrease in yield stress or the like).

CITATION LIST

Patent Literature

Patent Literature 1: JP 2003-292474 A
Patent Literature 2: JP 2001-026658 A
Patent Literature 3: JP 2001-064379 A

SUMMARY OF INVENTION

Technical Problem

The present invention aims to provide a polyester resin composition capable of producing a molded article having excellent stretchability. The present invention also aims to provide a molded article including the polyester resin composition.

Solution to Problem

The present invention relates to a polyester resin composition including: a polyester resin; and a polyrotaxane that has a cyclic molecule, a linear molecule threading through a cavity of the cyclic molecule in a skewered manner, and capping groups capping both ends of the linear molecule.

The present invention is specifically described in the following.

The present inventors found out that the use of a polyester resin and a polyrotaxane in combination can provide a molded article excellent in stretchability without lowering other physical properties, thereby completing the present invention.

The polyester resin composition of the present invention contains a polyester resin.

Any polyester resin having an ester bond in the main chain can be used. Examples thereof include aliphatic polyesters such as α-hydroxycarboxylic acid polyesters (e.g., polylactic acid, polyglycolic acid), lactone polyesters (e.g., poly(ç-caprolactone), poly(δ-valerolactone)), and diol-dicarboxylic acid polyesters (e.g., polyethylene succinate, polybutylene adipate); and aromatic polyesters such as polyethylene terephthalate, polytrimethylene terephthalate, polybutylene terephthalate, and polyethylene naphthalate. In terms of compatibility with polyrotaxane, the composition preferably contains α-hydroxy carboxylic acid polyester(s). In terms of biodegradability, the composition more preferably contains a polylactic acid resin and/or a polyglycolic acid resin. In a case where the transparency is required, the composition preferably contains a polylactic acid resin.

These polyester resins may be used alone, in combination of two or more thereof, or in the form of a copolymer.

The term "polylactic acid resin" refers to a polymer having a segment derived from lactic acid. The polylactic acid resin may contain other segment(s) derived from copolymerization component(s) other than lactic acid, provided that the aims of the present invention are not impaired. Similarly, the term "polyglycolic acid resin" refers to a polymer having a segment derived from glycolic acid. The polyglycolic acid resin may contain other segment(s) derived from copolymerization component(s) other than glycolic acid, provided that the aim of the present invention is not impaired.

In terms of biodegradability, the polyester resin preferably has a main chain consisting only of an aliphatic structure.

The lower limit of the mass average molecular weight of the polyester resin is preferably 10,000, and the upper limit thereof is preferably 1,000,000 in terms of processability, though it depends on the application of the composition. The lower limit of the mass average molecular weight of the polyester resin is more preferably 20,000, and the upper limit thereof is more preferably 300,000.

The mass average molecular weight as used herein is a polystyrene-equivalent value calculated based on the measurement by GPC, unless otherwise specified. A column used for determination of the polystyrene-equivalent mass average molecular weight by GPC is, for example, TSKgel SuperHM-M (Tosoh Corporation).

The polyester resin may be crystalline, semi-crystalline, or amorphous. In any case, the same effect can be achieved.

When the polyester resin is crystalline or semi-crystalline, the lower limit of the melting point is preferably 60° C. and the upper limit thereof is preferably 250° C. The lower limit is more preferably 100° C. and the upper limit is more preferably 200° C.

When the polyester resin is amorphous, the lower limit of the glass transition temperature is preferably 40° C., and the upper limit thereof is preferably 250° C. The lower limit is more preferably 50° C., and the upper limit thereof is more preferably 200° C.

The lower limit of the polyester resin content of the whole polyester resin composition of the present invention is preferably 80% by mass, and the upper limit thereof is preferably 99.9% by mass. With the polyester resin content within the above range, the resulting molded article has sufficiently improved stretchability without causing a significant decrease in yield stress. The lower limit of the polyester resin content is more preferably 90% by mass, and the upper limit thereof is more preferably 99.5% by mass.

The polyester resin composition of the present invention contains a polyrotaxane that has a cyclic molecule, a linear molecule threading through a cavity of the cyclic molecule in a skewered manner, and capping groups capping both ends of the linear molecule.

The cyclic molecule is not particularly limited as long as it can include a linear molecule threading through a cavity of the cyclic molecule in a skewered manner and can move along the linear molecule.

As a method for including the linear molecule in the cyclic molecule, a conventionally known method (e.g., method disclosed in JP 2005-154675 A) may be employed. The word "cyclic" of the cyclic molecule as used herein refers to a state of being substantially cyclic. As long as the molecule can move along the linear molecule, the cyclic molecule does not need to have a completely closed ring structure and may have, for example, a helical structure.

Examples of the cyclic molecule include cyclic polymers such as cyclic polyethers, cyclic polyesters, and cyclic polyether amines, pillararenes, cyclophanes, expanded porphyrins, and cyclodextrins.

Examples of the cyclic polymers include crown ethers and derivatives thereof, calixarenes and derivatives thereof, cyclophanes and derivatives thereof, and cryptands and derivatives thereof.

The cyclic molecule is appropriately selected depending on the kind of the linear molecule to be used. Preferred are cyclodextrins such as α-cyclodextrin, β-cyclodextrin, and γ-cyclodextrin because they are readily available and many kinds of capping groups can be used. For example, as described later, in the case where polyethylene glycol is selected as a linear molecule, preferred is α-cyclodextrin in terms of the stability of the inclusion complex to be obtained.

In the case where a cyclodextrin is used as the cyclic molecule, the hydroxy groups of the cyclodextrin is preferably partially modified with a modification group that can impart compatibility with the polyester resin (hereafter, also referred to as a "solubility-imparting group").

Examples of the solubility-imparting group include an acetyl group, a C1-C18 alkyl group, a trityl group, a trimethylsilyl group, a phenyl group, a polyester chain, an oxyethylene chain, and a polyacrylic acid ester chain. In particular, a polycaprolactone chain is preferably introduced as a polyester chain from the standpoint of enhancing the compatibility of the polyrotaxane with the polyester resin. These solubility-imparting groups may be introduced alone, or in combination of two or more thereof. When two or more kinds of solubility-imparting groups are introduced, for example, when an oxyethylene chain and a polyester chain are introduced, a hydroxy group of the cyclodextrin is first modified with an oxyethylene chain, and a polyester chain is introduced from the hydroxy group at an end of the introduced oxyethylene chain. Specifically, after addition of a hydroxypropyl group to a hydroxy group present in the cyclodextrin itself, ring-opening polymerization of ε-caprolactone is carried out via a hydroxy group of the hydroxypropyl group so that a polycaprolactone chain is introduced.

In the case where a cyclodextrin is used as the cyclic molecule, the lower limit of the introduction rate of the solubility-imparting groups relative to all the hydroxy groups of the cyclodextrin is preferably 10 mol %, and the upper limit thereof is preferably 90 mol % in terms of the compatibility with the polyester resin. The lower limit is more preferably 30 mol %, and the upper limit is more preferably 70 mol %.

In the case where a polycaprolactone chain is introduced to the cyclic molecule, the polycaprolactone chain may have a substituent at its terminal (hereafter, also referred to as "terminal substituent") with an aim of further improving the compatibility of the polyrotaxane with the polyester resin.

Examples of the terminal substituent of the polycaprolactone chain include hydroxy, carboxyl, ester, and (meth)acryloyl groups. Preferred among these are hydroxy and carboxyl groups, and more preferred is a carboxyl group.

The term "(meth)acryloyl" as used herein refers to at least one of "acryloyl" and "methacryloyl".

The lower limit of the introduction rate of the terminal substituent of the polycaprolactone chain is preferably 50 mol % and the upper limit thereof is preferably 90 mol % relative to the entire terminal groups of the polycaprolactone chain. The lower limit thereof is more preferably 70 mol %.

The terminal substituent can be introduced to the polycaprolactone chain by reacting a reactive group (e.g., a terminal hydroxy group of a polycaprolactone chain in a cyclic molecule before introduction of the substituent) with a compound having a functional group that is reactive with the reactive group and a substituent to be introduced.

Examples of the compound having a functional group that is reactive with the reactive group and a substituent to be introduced include: when a carboxyl group is to be introduced, cyclic acid anhydrides (e.g., succinic anhydride, methyl succinic anhydride, dodecenyl succinic anhydride, caronic anhydride, maleic anhydride, citraconic anhydride, 1,1-cyclohexane diacetic anhydride, diacetyl tartaric anhydride, glutaric anhydride, 3,3-dimethyl glutaric anhydride, diglycolic anhydride, phthalic anhydride, trimellitic anhydride, hexahydrophthalic anhydride, methylhexahydrophthalic anhydride, methyltetrahydrophthalic anhydride, tetrahydrophthalic anhydride, himic anhydride, chlorendic anhydride, camphoric anhydride, norbornadienedicarboxylic anhydride, 1,8-naphthalic anhydride, isatonic anhydride, and diphenic anhydride); when an ester group is to be introduced, acide chlorides (e.g., acetyl chloride and propionic chloride), carboxylic anhydrides (e.g., acetic anhydride and propionic anhydride), and esters (e.g., methyl acetate and ethyl acetoacetate); and when a (meth)acryloyl group is to be introduced, (meth)acryloyl chloride, (meth)acrylic anhydride, 2-(meth)acryloyloxyethyl isocyanate, 2-hydroxyethyl (meth)acrylate, glycidyl (meth)acrylate, α-methacryloyloxy-γ-butyrolactone, and β-methacryloyloxy-γ-butyrolactone.

The inclusion rate refers to a ratio (in percentage) of the actual inclusion amount of the cyclic molecule relative to the maximum inclusion amount of the cyclic molecule when the linear molecule is included in the cyclic molecule. The lower limit of the inclusion rate is preferably 0.1%, whereas the upper limit thereof is preferably 60%. The lower limit is more preferably 1%, and the upper limit is more preferably 50%. The lower limit is still more preferably 5%, and the upper limit is still more preferably 40%.

The maximum inclusion amount can be determined based on the length of the linear molecule and the thickness of the cyclic molecule. For example, the maximum inclusion amount in the case where the linear molecule is polyethylene glycol and the cyclic molecule is α-cyclodextrin has been experimentally determined (see Macromolecules 1993, 26, 5698-5703).

The linear molecule is not particularly limited as long as it can be included in a cavity of the cyclic molecule in a skewered manner. Examples thereof include polyvinyl alcohol, polyvinyl pyrrolidone, polyacrylamide, polyethylene oxide, polyethylene glycol, polypropylene glycol, polyvinyl methyl ether, polytetrahydrofuran, polyaniline, acrylonitrile-butadiene-styrene copolymers (ABS resin), casein, gelatin, starch, cellulose resins (e.g., carboxymethyl cellulose, hydroxyethyl cellulose, hydroxypropyl cellulose), polyolefin resins (e.g., polyethylene, polypropylene, polyisobutylene, and copolymers of a monomer constituting these and another olefinic monomer), polyester resins, polyvinyl chloride resins (e.g., polyvinyl chloride, vinyl chloride-vinyl acetate copolymer), polystyrene resins (e.g., polystyrene, acrylonitrile-styrene copolymer), acrylic resins (e.g., poly(meth)acrylic acid, polymethyl methacrylate, (meth)acrylic acid ester copolymer, acrylonitrile-methyl acrylate copolymer), polycarbonate resins, polyurethane resins, polyvinyl acetal resins (e.g., polyvinyl butyral resin), polyamide resins (e.g., nylon(®)), polyimide resins, polydiene resins (e.g., polyisoprene, polybutadiene), polysiloxane resins (e.g., polydimethyl siloxane), polysulfone resins, polyimine resins (e.g., polyethylene imine), polyamine resins, polyacetic anhydride resins, polyurea resins, polysulfide resins, polyphosphazene resins, polyketone resins, polyphenylene resins, polyhaloolefin resins, and copolymers, derivatives, and modified products of these. Preferred among these are polyethylene glycol, polyisoprene, polyisobutylene, polybutadiene, polypropylene glycol, polytetrahydrofuran, polydimethyl siloxane, polyethylene, polypropylene, polyvinyl alcohol, and polyvinyl methyl ether. More preferred are polyethylene glycol, polypropylene glycol, polytetrahydrofuran, polydimethyl siloxane, polyethylene, and polypropylene. Still more preferred is polyethylene glycol.

The term "(meth)acrylic" as used herein refers to at least one of "acrylic" and "methacrylic".

The lower limit of the mass average molecular weight of the linear molecule is preferably 3,000, and the upper limit thereof is preferably 300,000. With the mass average molecular weight of the linear molecule within the above range, the stretchability of a molded article to be obtained can be sufficiently improved without reduction in the compatibility between the polyrotaxane and the polyester resin. The lower limit of the mass average molecular weight of the linear molecule is more preferably 5,000, and the upper limit thereof is more preferably 100,000. The lower limit is still more preferably 10,000, and the upper limit is still more preferably 50,000.

The mass average molecular weight of the linear molecule is a polyethylene glycol-equivalent value calculated based on the measurement by gel permeation chromatography (GPC). A column used for the determination of a polyethylene glycol-equivalent mass average molecular weight by GPC is, for example, TSKgel SuperAWM-H (Tosoh Corporation).

The polyrotaxane used in the present invention preferably has polyethylene glycol as a linear molecule and a molecule derived from α-cyclodextrin as a cyclic molecule.

The capping groups are placed at both ends of the linear molecule included in the cyclic molecule to prevent separation of the cyclic molecule. The method for capping both ends of the linear molecule with capping groups may be a conventionally known method (e.g, method disclosed in JP 2005-154675 A).

Examples of the capping groups include dinitrophenyl groups, cyclodextrins, adamantane groups, trityl groups, fluoresceins, silsesquioxanes, pyrenes, anthracenes, and main chains or side chains of polymers having a mass average molecular weight of 1,000 to 1,000,000.

Preferred among these are dinitrophenyl groups, cyclodextrins, adamantane groups, trityl groups, fluoresceins, silsesquioxanes, and pyrenes. More preferred are adamantane groups and trityl groups.

Examples of the polymer having a mass average molecular weight of 1,000 to 1,000,000 include polyamide, polyimide, polyurethane, polydimethyl siloxane, and polyacrylic ester.

Two or more kinds of these capping groups may be present together in the polyrotaxane.

The lower limit of the polyrotaxane content of the whole polyester resin composition of the present invention is preferably 0.1% by mass, whereas the upper limit thereof is preferably 20% by mass. With the polyrotaxane content within this range, a molded article to be obtained is particularly excellent in stretchability. The lower limit of the polyrotaxane content is more preferably 0.5% by mass, and the upper limit thereof is more preferably 15% by mass. The upper limit is still more preferably 10% by mass.

The polyester resin composition of the present invention may optionally contain, to the extent that the aims of the present invention are not impaired, additives such as a crosslinking agent, a curing accelerator, a hydrolysis inhibitor, an antioxidant, a plasticizer, an ultraviolet absorber, a nucleating agent, a flame retardant, and a filler.

Examples of the crosslinking agent include polycarbodiimide, styrene-acrylic copolymers having an epoxy group, acrylic copolymers having an epoxy group, and ethylene-glycidyl methacrylate copolymers.

Examples of the hydrolysis inhibitor include carbodiimide compounds, isocyanate compounds, and oxazoline compounds.

Examples of the antioxidant include pheholic antioxidants, amine antioxidants, phosphorus antioxidants, and sulfur antioxidants.

Examples of the plasticizer include glycerol ester compounds, lactic acid ester compounds, dibasic acid ester compounds, and polyalkylene glycols.

Examples of the ultraviolet absorber include benzophenone ultraviolet absorbers, benzotriazole ultraviolet absorbers, triazine ultraviolet absorbers, and benzoate ultraviolet absorbers.

Examples of the nucleating agent include organic amide compounds, organic hydrazide compounds, carboxylic acid ester compounds, organic sulfonates, organic phosphonates, and talc.

Examples of the flame retardant include bromine flame retardants, metal hydroxide flame retardants, and phosphorus flame retardants.

Examples of the filler include glass fibers, glass beads, carbon fibers, calcium carbonate, clay, cellulose, and chitin.

The total amount of the additives is preferably 100% by mass or less relative to the entire amount of the polyester resin composition of the present invention.

The polyester resin composition of the present invention can be produced, for example, by mixing the polyester resin, the polyrotaxane, and, if needed, additives uniformly using a Henschel mixer or a blender and then melt-kneading the mixture using a melt kneader such as a roll, an extruder, a Banbury mixer, or a Brabender plastograph. For another example, the polyester resin composition of the present invention can be produced by dissolving the polyester resin, the polyrotaxane, and, if needed, additives in a solvent, stirring the solution, and then removing the solvent.

The present invention also encompasses a molded article including the polyester resin composition of the present invention.

The molded article of the present invention may have any shape, and may be in the shape of, for example, a strand, a film, a plate, or a pellet.

The molded article of the present invention may be produced, for example, by injection molding, compression molding, extrusion molding, inflation molding, blow molding, or calendering.

The lower limit of the breaking elongation, which represents the stretchability, of the molded article of the present invention is preferably 50%, more preferably 100%, still more preferably 150%, particularly preferably 200%. The breaking elongation can be determined by a tensile test using a universal tester such as AGS-J (Shimadzu Corporation) under the conditions of a measurement temperature of 25° C. and a tension rate of 20 ram/min.

The molded article of the present invention is hard and stretchable, and therefore is usable for various applications. Exemplary applications of the molded article of the present invention include films, agricultural materials, electric/electronic components, building components, automotive components, commodities, and fibers.

Advantageous Effects of Invention

The present invention can provide a polyester resin composition that can provide a molded article having excellent stretchability. The present invention can also provide a molded article including the polyester resin composition.

BRIEF DESCRIPTION OF DRAWINGS

FIG. 1 is a transmission electron microscope photo of a resin composition obtained in Example 4.

DESCRIPTION OF EMBODIMENTS

The present invention is more specifically described in the following with reference to, but not limited to, examples. The polyrotaxane used in preparation examples was prepared with reference to the method disclosed in JP 2011-241401 A.

Preparation Example 1

(Preparation of Carboxylated Polyrotaxane (Colorless Rubber-Like Material))

An amount of 100 g of a 35% by mass xylene solution of polyrotaxane (inclusion rate of cyclic molecule: 25%, mass average molecular weight: 470,000, hydroxy value: 74 mgKOH/g; hereafter, also referred to as "PR") having: polyethylene glycol (mass average molecular weight: 35,000) as a linear molecule; α-cyclodextrin (substitution degree of hydroxypropyl group: 51%) in which a hydroxypropyl group is introduced and then ε-caprolactone was graft-polymerized as a cyclic molecule; and adamantane amine groups as capping groups was prepared. The solution was blended with 9.2 g of a mixture of 4-methyl hexahydrophthalic anhydride and hexahydrophthalic anhydride ("RIKACID MH-700", New Japan Chemical Co., Ltd.), 14.0 g of triethylamine, and 0.34 g of 4-dimethylaminopyridine. The mixture was stirred at 80° C. for three hours. The resulting mixed liquid was cooled to room temperature, blended with 32.3 g of p-toluenesulfonic acid monohydrate, and stirred at room temperature for 30 minutes. The resulting white slurry was blended with a large amount of methanol for precipitation of polymers. The supernatant was removed, and the polymers were washed with methanol three times to give a white precipitate. The white precipitate was dried at 120° C. for three hours, thereby obtaining 40 g of a carboxylated polyrotaxane in the form of a colorless rubber-like material. The acid value of the carboxylated polyrotaxane in the form of a colorless rubber-like material was determined by a method in conformity with JIS K 0070. The result showed that the introduction rate (modification rate) of carboxyl groups was 89.2%.

Preparation Example 2

(Preparation of Carboxylated Polyrotaxane (White Rubber-Like Material))

An amount of 100 g of the 35% by mass xylene solution of PR described in Preparation Example 1 was blended with 9.2 g of a mixture of 4-methyl hexahydrophthalic anhydride and hexahydrophthalic anhydride ("RIKACID MH-700", New Japan Chemical Co., Ltd.), and stirred at 80° C. for six hours. The obtained mixed liquid was cooled to room temperature, blended with a large amount of methanol for precipitation of polymers. The supernatant was removed, and the polymers were washed with methanol three times to give a white precipitate. The white precipitate was dried at 80° C. for three hours, thereby obtaining 37 g of a carboxylated polyrotaxane in the form of a white rubber-like material. The acid value of the carboxylated polyrotaxane in the form of a white rubber-like material was determined by a method in conformity with JIS K 0070. The result showed that the introduction rate (modification rate) of carboxyl groups was 70.6%.

Examples 1 to 5

The polyester resin used was a crystalline polylactic acid ("IngeoPolymer 2003D", Natureworks LLC., poly(L-lactic acid), mass average molecular weight: 200,000). The polyrotaxane used was the above PR. They were dissolved in chloroform at a ratio shown in Table 1, and stirred for one hour. The chloroform was removed, thereby preparing a resin composition.

FIG. 1 is a transmission electron microscope photo of a resin composition obtained in Example 4.

Comparative Example 1

A resin composition was prepared in the same manner as in Example 1, except that no polyrotaxane was used.

Comparative Example 2

A resin composition was prepared in the same manner as in Example 4, except that the polyrotaxane was changed to poly(ε-caprolactone) ("Placcel 302", Daicel Corporation).

Comparative Example 3

A resin composition was prepared in the same manner as in Example 1, except that the polyrotaxane was changed to poly(ε-caprolactone) ("Placcel 302", Daicel Corporation).

Comparative Example 4

A resin composition was prepared in the same manner as in Example 4, except that the polyrotaxane was changed to polyethylene glycol (Wako Pure Chemical Industries, Ltd.).

Comparative Example 5

A resin composition was prepared in the same manner as in Example 1, except that the polyrotaxane was changed to glycerol diacetomonolaurate ("Rikemal PL-012", Riken Vitamin Co., Ltd.) as a low-molecular-weight plasticizer.

Examples 6 and 7

Crystalline polylactic acid ("IngeoPolymer 2003D", Natureworks LLC., poly(L-lactic acid) acid, mass average molecular weight: 200,000) as the polyester resin and the carboxylated polyrotaxane in the form of a colorless rubber-like material synthesized in Preparation Example 1 as the polyrotaxane were charged into a kneading and extrusion tester ("Laboplastomill 4C150", Toyo Seiki Seisakusho, Ltd.) at a ratio shown in Table 1, and melt-kneaded at 190° C. and at a rotation speed of 50 rpm for 10 minutes to give a resin composition.

Example 8

A resin composition was prepared in the same manner as in Example 6, except that the carboxylated polyrotaxane in the form of colorless rubber-like material prepared in Preparation Example 1 was changed to the carboxylated polyrotaxane in the form of a white rubber-like material prepared in Preparation Example 2.

Example 9

A resin composition was prepared in the same manner as in Example 6, except that the polyester resin was changed from the crystalline polylactic acid to an amorphous polylactic acid ("IngeoPolymer 4060D", Natureworks LLC., poly(DL-lactic acid), mass average molecular weight: 100,000).

Comparative Example 6

A resin composition was prepared in the same manner as in Example 6, except that no polyrotaxane was used.

Comparative Example 7

A resin composition was prepared in the same manner as in Example 9, except that no polyrotaxane was used.

Examples 10 and 11

A semi-crystalline polyglycolic acid ("Kuredux 100R60", Kureha Corporation, mass average molecular weight: 170,000) as the polyester resin and the carboxylated polyrotaxane in the form of a colorless rubber-like material synthesized in Preparation Example 1 as the polyrotaxane were charged into a kneading and extruding tester ("Laboplastomill 4C150", Toyo Seiki Seisakusho, Ltd.) at a ratio shown in Table 1, and melt-kneaded at 230° C. and at a rotation speed of 50 rpm for 10 minutes to give a resin composition.

Comparative Example 8

A resin composition was prepared in the same manner as in Example 10, except that no polyrotaxane was used.

Comparative Example 9

Polycarbonate ("Panlite L1225-Y", Teijin Chemicals Ltd., mass average molecular weight: 22,000) and the carboxylated polyrotaxane in the form of a colorless rubber-like material synthesized in Preparation Example 1 as the polyrotaxane were charged into a kneading and extruding tester ("Laboplastomill 4C150", Toyo Seiki Seisakusho, Ltd.) at a ratio shown in Table 2, and melt-kneaded at 260° C. and at a rotation speed of 50 rpm for 10 minutes to give a resin composition.

Comparative Example 10

A resin composition was prepared in the same manner as in Comparative Example 9, except that no polyrotaxane was used.

<Evaluation>

The resin compositions obtained in the examples and comparative examples were evaluated for the following parameters. Tables 1 and 2 show the results.

(Yield Stress, Breaking Stress, Breaking Elongation, and Tensile Modulus of Elasticity)

The resin composition obtained in each of the examples and comparative examples was sandwiched between metal plates, pressed at 180° C. (240° C. in the case of the resin compositions of Comparative Examples 9 and 10) and 10 MPa for two minutes, and cooled in a cooling press machine at 20° C. for two minutes, thereby preparing a molded article in a sheet shape with a size of 100 mm in length×100 mm in width×0.6 mm in thickness. A test sample for a tensile test was cut out from the obtained molded article in conformity with JIS K 7162-5B.

The obtained sample was subjected to a tensile test at a measurement temperature of 25° C. and a tension rate of 20 ram/min using a universal tester ("AGS-J", Shimadzu Corporation) for determining the yield stress, breaking stress, and breaking elongation. The tensile test was also performed at a measurement temperature of 25° C. and a tension rate of 1 ram/min for determining the tensile modulus of elasticity.

(Total Light Transmittance)

The resin composition of each of the examples and comparative examples in which a polylactic acid was used was sandwiched between metal plates, pressed at 180° C. and 10 MPa for two minutes, and cooled in a cold press machine at 20° C. for two minutes, thereby preparing a molded article in the sheet shape with a size of 100 mm in length×100 mm in width×0.2 mm in thickness. The total light transmittance of the obtained molded article was determined using a haze meter ("NDH 300A", Nippon Denshoku Industries Co., Ltd.).

TABLE 1

|  |  |  | Example | | | | | |
|---|---|---|---|---|---|---|---|---|
|  |  |  | 1 | 2 | 3 | 4 | 5 | 6 |
| Composition (parts by mass) | Polyester resin | Crystalline polylactic acid | 90 | 95 | 97 | 99 | 99.5 | 99 |
|  |  | Amorphous polylactic acid | — | — | — | — | — | — |
|  |  | Semi-crystalline polyglycolic acid | — | — | — | — | — | — |
|  |  | Poly(ε-caprolactone) | — | — | — | — | — | — |
|  | Polyrotaxane | PR | 10 | 5 | 3 | 1 | 0.5 | — |
|  |  | Carboxylated polyrotaxane (colorless rubber-like material) | — | — | — | — | — | 1 |
|  |  | Carboxylated polyrotaxane (white rubber-like material) | — | — | — | — | — | — |
|  |  | Polyethylene glycol | — | — | — | — | — | — |
|  |  | Low-molecular-weight plasticizer | — | — | — | — | — | — |
|  |  | Polycarbonate | — | — | — | — | — | — |
|  |  | Production method | Solution mixing | Solution mixing | Solution mixing | Solution mixing | Solution mixing | Melt kneading |
| Evaluation |  | Yield stress (MPa) | 40 | 56 | 53 | 59 | 63 | 66 |
|  |  | Breaking stress (MPa) | 36 | 47 | 28 | 27 | 40 | 42 |
|  |  | Breaking elongation (%) | 332 | 368 | 202 | 233 | 266 | 279 |
|  |  | Tensile modulus of elasticity (GPa) | 2.3 | 1.9 | 2.2 | 2.4 | 2.9 | 2.7 |
|  |  | Total light transmittance (%) | 88 | 90 | 91 | 94 | 95 | 94 |

|  |  |  | Example | | | | |
|---|---|---|---|---|---|---|---|
|  |  |  | 7 | 8 | 9 | 10 | 11 |
| Composition (parts by mass) | Polyester resin | Crystalline polylactic acid | 99.5 | 99 | — | — | — |
|  |  | Amorphous polylactic acid | — | — | 99 | — | — |
|  |  | Semi-crystalline polyglycolic acid | — | — | — | 97 | 99 |
|  |  | Poly(ε-caprolactone) | — | — | — | — | — |
|  | Polyrotaxane | PR | — | — | — | — | — |
|  |  | Carboxylated polyrotaxane (colorless rubber-like material) | 0.5 | — | 1 | 3 | 1 |
|  |  | Carboxylated polyrotaxane (white rubber-like material) | — | 1 | — | — | — |
|  |  | Polyethylene glycol | — | — | — | — | — |
|  |  | Low-molecular-weight plasticizer | — | — | — | — | — |
|  |  | Polycarbonate | — | — | — | — | — |
|  |  | Production method | Melt kneading | Melt kneading | Melt kneading | Melt kneading | Melt kneading |
| Evaluation |  | Yield stress (MPa) | 63 | 68 | 56 | 89 | 91 |
|  |  | Breaking stress (MPa) | 43 | 43 | 44 | 83 | 70 |
|  |  | Breaking elongation (%) | 260 | 272 | 319 | 59 | 20 |
|  |  | Tensile modulus of elasticity (GPa) | 3.2 | 3.0 | 2.9 | 5.2 | 5.2 |
|  |  | Total light transmittance (%) | 94 | 94 | 94 | — | — |

TABLE 2

|  |  |  | Comparative Example | | | | | |
|---|---|---|---|---|---|---|---|---|
|  |  |  | 1 | 2 | 3 | 4 | 5 | 6 |
| Composition (parts by mass) | Polyester resin | Crystalline polylactic acid | 100 | 99 | 90 | 99 | 90 | 100 |
|  |  | Amorphous polylactic acid | — | — | — | — | — | — |
|  |  | Semi-crystalline polyglycolic acid | — | — | — | — | — | — |
|  |  | Poly(ε-caprolactone) | — | 1 | 10 | — | — | — |
|  | Polyrotaxane | PR | — | — | — | — | — | — |
|  |  | Carboxylated polyrotaxane (colorless rubber-like material) | — | — | — | — | — | — |
|  |  | Carboxylated polyrotaxane (white rubber-like material) | — | — | — | — | — | — |
|  |  | Polyethylene glycol | — | — | — | 1 | — | — |
|  |  | Low-molecular-weight plasticizer | — | — | — | — | 10 | — |
|  |  | Polycarbonate | — | — | — | — | — | — |
|  |  | Production method | Solution mixing | Solution mixing | Solution mixing | Solution mixing | Solution mixing | Melt kneading |
| Evaluation |  | Yield stress (MPa) | 66 | 65 | 30 | 57 | 28 | 69 |
|  |  | Breaking stress (MPa) | 63 | 52 | 32 | 49 | 38 | 65 |
|  |  | Breaking elongation (%) | 3 | 5 | 431 | 10 | 350 | 6 |
|  |  | Tensile modulus of elasticity (GPa) | 3.7 | 2.9 | 2.0 | 2.3 | 1.0 | 3.8 |
|  |  | Total light transmittance (%) | 95 | 95 | 85 | 95 | 95 | 95 |

TABLE 2-continued

|  |  |  | Comparative Example | | | |
|---|---|---|---|---|---|---|
|  |  |  | 7 | 8 | 9 | 10 |
| Composition (parts by mass) | Polyester resin | Crystalline polylactic acid | — | — | — | — |
|  |  | Amorphous polylactic acid | 100 | — | — | — |
|  |  | Semi-crystalline polyglycolic acid | — | 100 | — | — |
|  |  | Poly(ε-caprolactone) | — | — | — | — |
|  | Polyrotaxane | PR | — | — | — | — |
|  |  | Carboxylated polyrotaxane (colorless rubber-like material) | — | — | 3 | — |
|  |  | Carboxylated polyrotaxane (white rubber-like material) | — | — | — | — |
|  |  | Polyethylene glycol | — | — | — | — |
|  |  | Low-molecular-weight plasticizer | — | — | — | — |
|  |  | Polycarbonate | — | — | 97 | 100 |
|  |  | Production method | Melt kneading | Melt kneading | Melt kneading | Melt kneading |
| Evaluation |  | Yield stress (MPa) | 63 | 97 | 63 | 65 |
|  |  | Breaking stress (MPa) | 55 | 97 | 62 | 65 |
|  |  | Breaking elongation (%) | 9 | 7 | 122 | 128 |
|  |  | Tensile modulus of elasticity (GPa) | 2.6 | 6.5 | 1.6 | 1.8 |
|  |  | Total light transmittance (%) | 96 | — | — | — |

Tables 1 and 2 show that the yield stress of a molded article prepared using each of the resin compositions of the examples in which polyrotaxane was used was equivalent to that of the resin compositions of Comparative Examples 1 and 6 to 8 in which no polyrotaxane was used, whereas the breaking elongation of the resin compositions in the case of the examples was much higher than that of the resin compositions of Comparative Examples 1 and 6 to 8. The resin compositions of Comparative Examples 2 and 4 in which polycaprolactone or polyethylene glycol that was a partial structure of the polyrotaxane was used instead of polyrotaxane failed to achieve such an effect. The resin compositions of Comparative Examples 3 and 5 prepared using a large amount of polycaprolactone or a low-molecular-weight plasticizer achieved significant improvement of the breaking elongation as in the case of using polyrotaxane. In these cases, however, the yield stress, tensile modulus of elasticity, and total light transmittance were markedly lowered.

Examples 6 and 9 in Table 1 show that, in both cases of using a crystalline polyester resin and an amorphous polyester resin, the effect of significantly improving the breaking elongation without markedly lowering the yield stress was achieved.

Comparison between Examples 10 and 11 and Comparative Example 8 shows that, even in the case of using polyglycolic acid as a polyester resin, the use of polyrotaxane in admixture with the polyglycolic acid significantly improved the breaking elongation without markedly lowering the yield stress.

Comparative Examples 9 and 10 in Table 2 show that a polycarbonate resin used in admixture with polyrotaxane failed to achieve the above effects.

FIG. 1 shows that polyrotaxane forms very fine domains with a size of at most several tens of nanometers in the polyester resin composition of the present invention. This shows that polyrotaxane has excellent compatibility with a polyester resin.

INDUSTRIAL APPLICABILITY

The present invention can provide a polyester resin composition capable of providing a molded article having excellent stretchability. The present invention can also provide a molded article including the polyester resin composition.

The invention claimed is:

1. A polyester resin composition comprising:
   a polyester resin; and
   a polyrotaxane that has a cyclic molecule, a linear molecule threading through a cavity of the cyclic molecule in a skewered manner, and capping groups capping both ends of the linear molecule,
   wherein a polycaprolactone chain is introduced to the cyclic molecule,
   the polycaprolactone chain has a carboxyl group as a substituent at its terminal, and
   the polyrotaxane contains polyethylene glycol as the linear molecule and a molecule derived from α-cyclodextrin as the cyclic molecule.

2. The polyester resin composition according to claim 1, wherein the polyester resin contains a polylactic acid resin and/or a polyglycolic acid resin.

3. A molded article comprising the polyester resin composition according to claim 1.

* * * * *